United States Patent [19]

Masaki

[11] 4,337,746

[45] Jul. 6, 1982

[54] SYSTEM FOR FEEDBACK CONTROL OF AIR/FUEL RATIO IN INTERNAL COMBUSTION ENGINE

[75] Inventor: Kenji Masaki, Yokohama, Japan

[73] Assignee: Nissan Motor Co., Ltd., Yokohama, Japan

[21] Appl. No.: 161,406

[22] Filed: Jun. 20, 1980

[30] Foreign Application Priority Data

Jun. 22, 1979 [JP] Japan .................................. 54-78697

[51] Int. Cl.³ ...................... G01N 27/58; F02D 33/00; G01N 27/46; F02D 3/04

[52] U.S. Cl. .................................... 123/489; 123/440; 60/276; 204/15; 204/195 S

[58] Field of Search .................. 123/489, 440; 60/276, 60/285; 204/15, 195 S

[56] References Cited

U.S. PATENT DOCUMENTS

| | | | |
|---|---|---|---|
| 4,121,548 | 10/1978 | Hattori et al. | 123/440 |
| 4,157,282 | 6/1979 | Riddel | 123/440 |
| 4,178,793 | 12/1979 | Bremer et al. | 123/489 |
| 4,194,471 | 3/1980 | Baresel | 123/440 |
| 4,226,221 | 10/1980 | Asano | 123/440 |
| 4,226,692 | 10/1980 | Isenberg | 123/440 |
| 4,237,829 | 12/1980 | Asano et al. | 123/440 |
| 4,264,425 | 4/1981 | Kimura et al. | 123/489 |

*Primary Examiner*—Raymond A. Nelli
*Attorney, Agent, or Firm*—Schwartz, Jeffery, Schwaab, Mack, Blumenthal & Koch

[57] ABSTRACT

A system for feedback control of air/fuel ratio in an internal combustion engine operated with a nonstoichiometric air-fuel mixture. The control system includes two oxygen-sensitive air/fuel ratio sensors which are of the concentration cell type having a solid electrolyte layer provided with two electrode layers and both disposed in an exhaust passage substantially at the same section. The first sensor is supplied with a constant DC current to cause migration of oxygen ions through the solid electrolyte layer and exhibits a slope output characteristic when a lean mixture or a rich mixture is supplied to the engine, depending on the direction of flow of the current. The second sensor exhibits on-off type output characteristic and can discriminate between a lean mixture and a rich mixture. A control circuit to produce a fuel feed rate control signal based on the output of the first sensor includes a discriminating means for ascertaining whether the output of the first sensor is truly attributed to the slope output characteristic with reference to the output of the second sensor.

11 Claims, 10 Drawing Figures

SYSTEM FOR FEEDBACK CONTROL OF AIR/FUEL RATIO IN INTERNAL COMBUSTION ENGINE

FIELD OF THE INVENTION

This invention relates to a feedback control system for precisely controlling the air/fuel ratio of an air-fuel mixture to be burned in an internal combustion engine by using a gas sensor which is sensitive to a specific component of an exhaust gas discharged from the engine. The system can provide a feedback signal indicative of an actual air/fuel ratio of a mixture supplied to the engine.

DESCRIPTION OF THE PRIOR ART

In connection with internal combustion engines, particularly in automobiles, one of the recently developed and important techniques is to provide feedback control of the fuel feed rate by using an exhaust sensor which is sensitive to a specific component of the exhaust gas and which provides an electrical signal indicative of the air/fuel ratio of a mixture supplied to the engine. Since a central system will operate the engine with an air-fuel mixture of a precisely controlled mixing ratio to thereby enable satisfactory purification of the exhaust gas and enhancement of engine efficiency. This technique has already been put into practical use and applied to both electronically controlled fuel injectors and carburetors.

Figure 1:
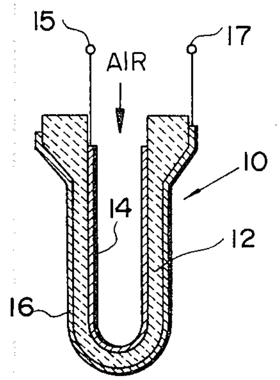
FIG. 1 is a schematic and sectional illustration of a conventional oxygen sensor.

With regard to the aforementioned exhaust sensor the prior art has used, almost exclusively, an oxygen sensor of the oxygen concentration cell type such a sensor basically consists of a layer of an oxygen ion conductive solid electrolyte such as zirconia stabilized with calcia and two electrode layers, each formed on one of the two opposite sides of the solid electrolyte layer. As shown in FIG. 1, the solid electrolyte layer of a practical oxygen sensor 10 of this type usually takes the form of a tube 12 having a closed end. A measurement electrode layer 16, usually of platinum, to be exposed to a sample gas is formed on the outside of the tube 12 so as to have a gas permeable porous structure. A gas permeable porous reference electrode layer 14 is also formed on the inside of the tube 12. An oxygen-containing gas such as air is introduced into the interior of the solid electrolyte tube 12 to establish a reference oxygen partial pressure on the reference electrode side of the solid electrolyte layer 12. This oxygen sensor 10 generates an electromotive force when there is a difference between the reference oxygen partial pressure and an oxygen partial pressure on the measurement electrode side of the solid electrolyte layer 12. This electromotive force is measured between two output terminals 15 and 17 as a signal indicative of the oxygen concentration in the sample gas.

Figure 2:
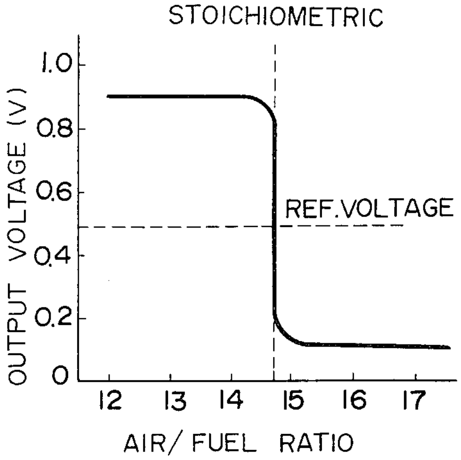
FIG. 2 shows an output characteristic of the oxygen sensor of FIG. 1 when used in an engine exhaust gas.

When this oxygen sensor 10 is attached to an exhaust pipe of an internal combustion engine so that the measurement electrode layer 16 is exposed to the exhaust gas while the reference electrode layer 14 is exposed to atmospheric air, the magnitude of an electromotive force generated by the sensor 10 is indicative of the air/fuel ratio of a mixture supplied to the engine but is not proportional to the air/fuel ratio. As shown in FIG. 2, the output voltage of this sensor 10 remains practically constantly at a maximally high level while the air/fuel ratio is below a stoichiometric ratio (about 14.7 for air-gasoline mixture), that is, while a rich mixture is supplied to the engine and, in contrast, remains practically constant at a minimally low level while the air/fuel ratio is below the stoichiometric ratio, that is, while a lean mixture is supplied to the engine. Clearly, a sharp change amounting to a discontinuity occurs in the level of the output voltage upon the occurrence of a change in the air/fuel ratio across the stoichiometric ratio. In exhaust gas monitoring, therefore, this sensor 10 exhibits an on-off output characteristic. As for the actual detection of air/fuel ratio values, this sensor 10 gives exact information practically only at one point, the stoichiometric point. When the air/fuel ratio deviates from the stoichiometric ratio, while it is possible to determine that the air/fuel ratio has deviated to the rich side if the output voltage of the sensor is above a certain reference voltage (0.5 V in FIG. 2) and to the lean side if below the reference voltage, it is impossible to determine numerical values of non-stoichiometric air/fuel ratios from the output of this sensor 10.

Therefore, the use of an oxygen sensor of the above described type in feedback controlling of the rate of fuel feed to an internal combustion engine is limited only to a case where the aim of the control is to maintain a stoichiometric air/fuel ratio or an approximately stoichiometric air/fuel ratio. A practical example of such a case is an engine system including a catalytic converter containing a so-called three-way catalyst which can catalyze both reduction of NOx and oxidation of CO and HC (unburned hydrocarbons) and which exhibits the highest conversion efficiencies in an exhaust gas produced by combustion of a stoichiometric air-fuel mixture.

Figure 3:
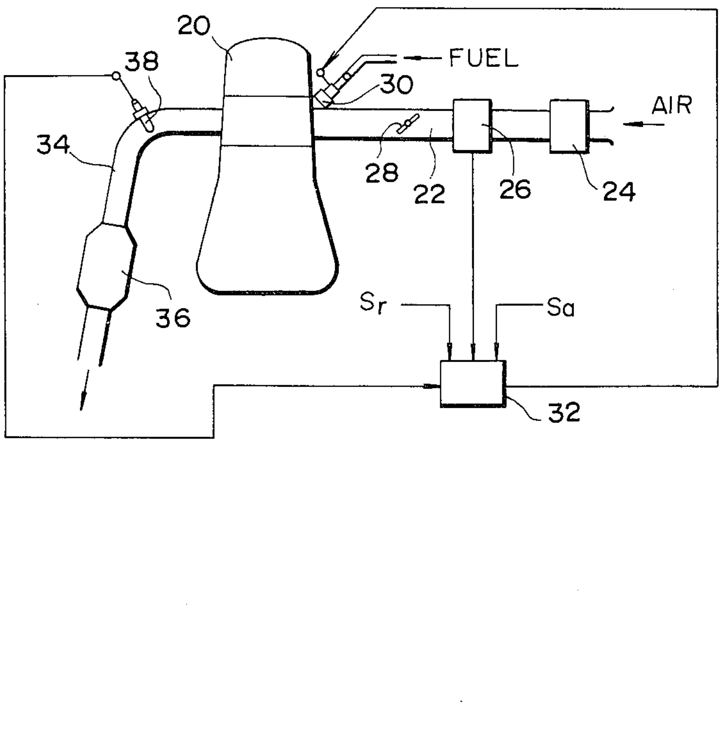
FIG. 3 PRIOR ART
FIG. 3 is a schematic illustration of a conventional air/fuel ratio control system for an internal combustion engine.

FIG. 3 illustrates a conventional automotive engine system which utilizes a three-way catalyst and includes a feedback type fuel feed rate control system. Indicated at 20 is a principal part of a gasoline engine. An induction passage 22 starting at an air cleaner 24 is provided with an air flow rate sensor 26 at a section upstream of a throttle valve 28 and electronically controlled fuel injection valves 30 at a section close to the combustion chambers of the engine 20. A control circuit 32 receives the output signal of the air flow rate sensor 26 together with an engine speed signal $S_r$ and an air temperature signal $S_t$ and provides a control signal to the fuel injection valves 30 to realize an optimal fuel feed rate determined on the basis of the information given by the input signals. Exhaust passage 34 is provided with a catalytic converter 36 containing therein a three-way catalyst, and an oxygen sensor 38 (of the type as shown in FIG. 1) which is installed in the exhaust passage 34 at a section upstream of the converter 36 to provide its output to the control circuit 32. In this system, the aim of the control of fuel feed rate is to maintain a stoichiometric air/fuel ratio thereby to allow the three-way catalyst to operate optimally the output of the oxygen sensor 34 serves as a feedback signal accurately indicating whether the stoichiometric air/fuel ratio is realized or not. When this feedback signal indicates a deviation of the air/fuel ratio from the stoichiometric ratio, the control circuit 32 performs a process of modulating the control signal applied to the fuel injection valves 30 so as to correct the actual air/fuel ratio to the desired stoichiometric ratio and continues this process until the output of the oxygen sensor 38 indicates a stoichiometric ratio. Thus, an oxygen sensor of the type as shown in FIG. 1 serves an important role in the control system of FIG. 3.

However, the use of a three-way catalyst has only limited industrial potential because a component of this catalyst needs to comprise rhodium which is a costly material and which is not expected to be in abundant supply. The most current prevailing method for purification of exhaust gases is the use of an oxidation catalyst in combination with certain other measures for reducing the emission of NOx, such as the recirculation of a portion of the exhaust gas. In the case of using an oxidation catalyst, it is usual to feed the engine with a relatively rich mixture such as about 13.5 in terms of air/fuel ratio. With such a rich mixture it is impossible to construct a feedback air/fuel ratio control system using the oxygen sensor 10 of FIG. 1 because, as can be seen in FIG. 2, the output voltage of this type of exhaust gas sensor remains practically constantly at a maximally high level whether the air/fuel ratio is 13.5 or substantially deviated therefrom, for example, by about 1.0 to either higher or lower side. The oxygen sensor 10 of FIG. 1 is not applicable to an engine system including a thermal reactor either, though the use of a thermal reactor is not so prevailing because of its unfavorable effect on fuel economy. In the case of a system using a thermal reactor, it is typical to employ a relatively rich mixture, such as about 12.5 in terms of air/fuel ratio. As can be seen in FIG. 2, the oxygen sensor 10 of FIG. 1 does not yield accurate information about numerical values of the air/fuel ratios when using such rich mixture.

In engine systems utilizing either a catalytic converter containing an oxidation catalyst or a thermal reactor, it is usual to introduce secondary air into the exhaust system to allow complete oxidation of large amounts of CO and HC contained in the exhaust gas in the catalytic converter or the reactor. The quantity of the secondary air is regulated such that the diluted exhaust gas generally corresponds to an exhaust gas produced by the combustion of an air-fuel mixture having an air/fuel ratio of about 16.5, thereby to attain the best exhaust-purifying efficiency. When an oxygen sensor, such as sensor 10 in FIG. 1 is disposed in the thus diluted exhaust gas, the output of the oxygen sensor remains constantly at a minimally low level as shown in FIG. 2 and, hence, is useless for accurate numerical detection of the air/fuel ratio.

It is therefore an object of this invention to provide feedback control of the air/fuel ratio in engine systems which can utilize the prevailing oxidation catalyst systems. Prior to the present invention, it was not practical to provide feedback control systems with oxidation catalyst systems since there was no practical exhaust sensor by which air/fuel ratio values different from the stoichiometric ratio could accurately be detected. Therefore, immense labors have been devoted to the development of the most efficient and durable catalytic converters containing an oxidation catalyst and fuel supply devices combined with such catalytic converters for the respective models of recently produced automobiles. Particularly great efforts have been directed to the development of fuel supply devices whose air-fuel proportioning characteristics are best matched with recent engines and oxidation catalyst systems, not only for exhaust-purifying efficiency but also because the mechanical and thermal efficiencies of the engine are greatly affected by the degree of such matching. In addition, mass production of recent fuel supply devices and major component parts thereof is performed under extremely strict quality control to minimize the differences in performance among the individual products. Of course these endeavors inevitably raise the cost of production by a considerable amount. In spite of these efforts, a limit has been placed on the improvement of fuel economy in automobiles utilizing either an oxidation catalyst or a thermal reactor by the impossibility of performing feedback control of air/fuel ratio.

Therefore, it is an additional object of the invention to provide a novel gas-sensing technique which enables to accurately detect non-stoichiometric air/fuel ratio values.

In this regard, U.S. patent application Ser. No. 28,747 filed Apr. 10, 1979 a device to detect air/fuel ratio values of either a lean mixture or a rich mixture supplied to an engine by means of an advanced oxygen-sensitive device which is of a modified concentration cell type and exhibits a desirable output characteristic when disposed in an exhaust gas and supplied with a constant DC current of an adequate intensity. The construction and function of this oxygen-sensitive device will be described with reference to FIGS. 4–6.

Figure 4:
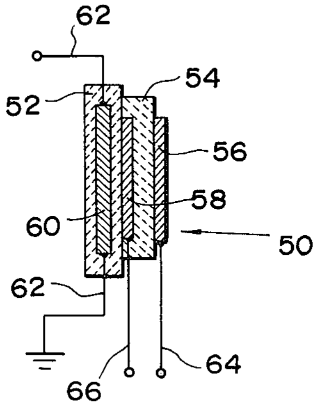
FIG. 4 shows schematically and sectionally a fundamental construction of an oxygen-sensitive air/fuel ratio sensor used in the present invention.

An oxidation-sensitive element 50 shown in FIG. 4 has a ceramic substrate 52 such as of alumina, and a microscopically porous layer 54 of an oxygen ion conductive solid electrolyte such as $ZrO_2$ stabilized with $Y_2O_3$ is formed on one side of the substrate 52. A platinum electrode layer 56 (which will hereinafter be called a measurement electrode layer) is formed on the outer side of the solid electrolyte layer 54. This electrode layer 56 has a gas permeable porous structure so that the gas subject to measurement not only contacts the outer surface of this layer 56 but also diffuses into the solid electrolyte layer 54. Another platinum electrode layer 58 (which will hereinafter be called a reference electrode layer) is formed on the other side of the solid electrolyte layer 54 so as to be sandwiched between the substrate 52 and the solid electrolyte layer 54 and, macroscopically, completely shielded from an environmental atmosphere by the substrate 52 and the layer 54. It will be understood that the three layers 54, 56 and 58 constitute an oxygen concentration cell. Usually each of these three layers 54, 56, 58 is formed as a thin, film-like layer. An electric heater element 60 is embedded in the substrate 52 because the concentration cell does not function efficiently unless it is maintained at a sufficiently high temperature. Indicated at 62 are leads to supply a heating current to the heater element 60, and at 64 and 66 are leads respectively attached to the two electrode layers 56 and 58.

Figure 5:
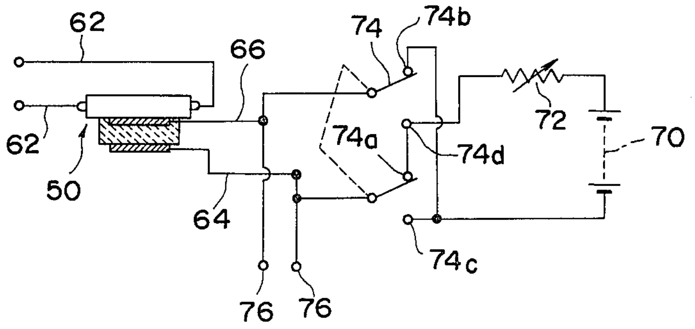
FIG. 5 is a diagrammatic illustration of the manner of using the sensor of FIG. 4.

To detect the mixing ratio of an air-fuel mixture subjected to combustion in an internal combustion engine, the oxygen-sensitive element 50 is entirely disposed in the exhaust gas and, instead of using a reference oxygen source such as air, a DC power supply 70 is connected to the leads 64 and 66, that is, to the two electrode layers 56 and 58 of this element, as shown in FIG. 5, to force a constant DC current of an adequate intensity (e.g. 3–10 $\mu$A) to flow through the solid electrolyte layer 54 between the two electrode layers 56 and 58. In FIG. 5, indicated at 72 is a variable resistor to regulate the intensity of the current. The purpose of supplying an electric current to the oxygen-sensitive element 50 is to establish a reference oxygen partial pressure at the interface between the reference electrode layer 58 and the solid electrolyte layer 54, while the measurement electrode layer 56 is directly exposed to the exhaust gas. The leads 64 and 66 are connected also to output terminals 76 where an electromotive force generated across the solid electrolyte layer 54 between the two electrode layers 56 and 58 is measured.

The magnitude of this electromotive force depends on the air/fuel ratio of the air-fuel mixture subjected to combustion, and the manner of the dependence is determined fundamentally by the direction of flow of the current supplied to the oxygen-sensitive element 50. In FIG. 5, a double-pole double-throw switch 74 is used to connect the DC power source 70 to the oxygen-sensitive element 50, and illustrated is a case where the measurement and reference electrode layers 56 and 58 are connected respectively to the positive and negative terminals of the DC power supply 70 by utilizing contacts 74*a* and 74*b* of the switch 74 so that the current flows through the solid electrolyte layer 54 from the measurement electrode layer 56 towards the reference electrode layer 58.

Since the measurement electrode layer 56 is made of platinum which acts as a catalyst, the CO and HC in the exhaust gas undergo oxidation reactions at the surface of this electrode layer 56 with consumption of oxygen contained in the exhaust gas. At the reference electrode layer 58 which is connected to the negative terminal of the power supply 70, there is a tendency for the gaseous oxygen in the exhaust gas diffused to this electrode layer 58 through the porous solid electrolyte layer 54 to ionized, followed by outflow of oxygen ions towards the measurement electrode layer 56.

While a fuel-rich mixture is supplied to the engine, ionization of oxygen at the reference electrode layer 58 is almost negligible because the relatively small amount of oxygen contained in the exhaust gas is almost entirely consumed in the oxidation reactions at the surface of the measurement electrode layer 56. Therefore, an oxygen partial pressure on the reference side of the solid electrolyte layer 54 does not significantly differ from the oxygen partial pressure on the measurement side, so that the output voltage of the element 50 becomes very low and does not significantly vary even though changes occur in the air/fuel ratio of the rich mixture.

When the air/fuel ratio increases above the stoichiometric ratio, the consumption of oxygen in the oxidation reactions becomes insignificant because of a great decrease in the total amount of CO and HC in the exhaust gas, whereas ionization of oxygen at the reference electrode layer 58 becomes significant. Therefore, the oxygensensitive element 50 produces a maximally high output voltage when the air/fuel ratio is slightly above the stoichiometric ratio. As the air/fuel ratio of the mixture (now a lean mixture) becomes higher the oxygen partial pressure at the reference electrode layer 58 gradually rises and nears the oxygen partial pressure in the exhaust gas because of an increasing rate of diffusion of gaseous oxygen through the solid electrolyte layer towards the reference electrode layer 58. Therefore the output voltage of the element 50 exhibits a gradual lowering as the air/fuel ratio increases, as represented by curve A in FIG. 6. That is, the element 50 exhibits a slope output characteristic when disposed in an exhaust gas produced from a lean mixture and when supplied by a constant DC current of an adequate intensity to flow from the measurement electrode layer 56 towards the reference electrode layer 58. If, however, the current intensity is greater than a certain critical value (e.g. about 15 $\mu$A), the output voltage of the same element 50 remains constant at a maximally high level while the air/fuel ratio varies but remains above the stoichiometric ratio because of a greatly enhanced rate of ionization of oxygen at the reference electrode layer 58. Then the oxygen-sensitive element 50 exhibits an on-off type output characteristic and becomes useful for detection of the stoichiometric air/fuel ratio.

Figure 6:
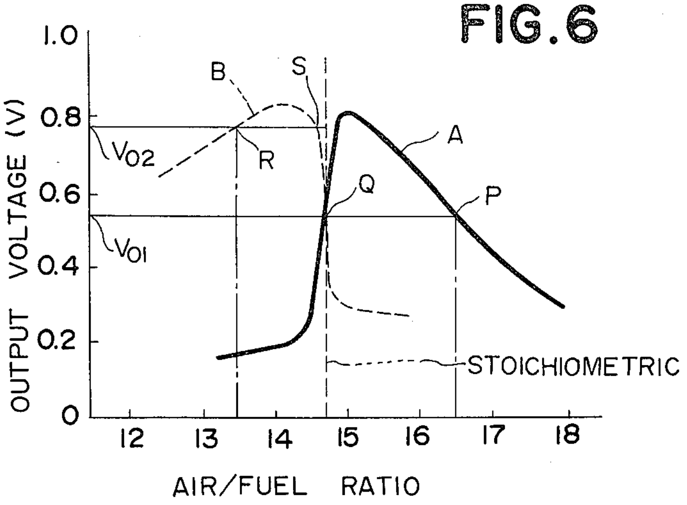
FIG. 6 shows output characteristics of the sensor of FIG. 4 when used in engine exhaust gases.

When the measurement and reference electrode layers 56 and 58 of the same element 50 are respectively connected to the negative and positive terminals of the DC power supply 70 by utilizing contacts 74*c* and 74*d* of the switch 74 so that a constant current of an adequate intensity flows through the solid electrolyte layer 54 from the reference side towards the measurement side, the element 50 in an exhaust gas exhibits a slope output characteristic as represented by curve B of FIG. 6 because of the following phenomena.

In this case ionization of oxygen occurs at the measurement electrode layer 56, followed by inflow of oxygen ions towards the reference electrode layer 58. While a lean mixture is supplied to the engine, the output voltage of the oxygen-sensitive element 50 remains nearly constantly at a very low level because under this condition an oxygen partial pressure on the reference side of the solid electrolyte layer 54 is determined primarily by diffusion of gaseous oxygen through the solid electrolyte layer 54 and becomes nearly equal to the oxygen partial pressure in the exhaust gas.

When the air/fuel ratio is less than the stoichiometric ratio, the consumption of oxygen in the oxidation reactions at the surface of the measurement electrode layer 56 becomes significant and results in a lowering of the oxygen partial pressure at the electrode layer 56 and a rise of the output voltage to a maximally high level. As the air/fuel ratio further decreases, the oxygen partial pressure at the reference electrode layer 58 gradually decreases because of greatly decreasing diffusion of gaseous oxygen towards this electrode layer 58, so that the output voltage of the element 50 exhibits a gradual lowering.

If, however, the current intensity is greater than a certain critical value the output voltage remains constant at a maximally high level while the air/fuel ratio varies but remains below the stoichiometric ratio.

Thus, it is possible to make the oxygen-sensitive element 50 exhibit any one of the three types of output characteristics respectively represented by the curves A and B of FIG. 6 and the curve of FIG. 2. The element 50 can therefore serve as a sensor to detect air/fuel ratio values of either a lean mixture or a rich mixture when used so as to exhibit a slope output characteristic represented by curve A or curve B.

However, when the sensor 50 is made to exhibit a slope output characteristic there is a matter of inconvenience in that an output voltage value of this sensor does not correspond to only one definite air/fuel ratio value. In the case of curve A, for example, the output voltage becomes $V_{01}$ not only when the air/fuel ratio is 16.5 (at point P in curve A) but also when the air/fuel ratio is 14.7 (stoichiometric, at point Q in curve A). If the target value of the air/fuel ratio control is 16.5, there is a possibility of making an erroneous judgement determination that the target value is reached although the true air/fuel ratio is 14.7. In the case of curve B, the output voltage becomes $V_{02}$ when the air/fuel ratio is either 13.5 (at point R) or 14.5 (nearly stoichiometrical, at point S).

SUMMARY OF THE INVENTION

It is therefore an object of the present invention to provide a system for feedback control of the air-fuel mixing ratio in an internal combustion engine, wherein the system is able to employ any air/fuel ratio value within the range practical for gasoline engines and Diesel engines as the target of the control and, hence, is applicable to engines provided with either a catalytic converter containing an oxidation catalyst or a thermal reactor.

In accordance with the present invention, there is provided a feedback control system for the control of the air/fuel ratio of an air-fuel mixture supplied to an internal combustion engine which preferably comprises an electrically controllable fuel supply means for supplying fuel into an induction passage for the engine, a first oxygen-sensitive air/fuel ratio sensor disposed in an exhaust passage for the engine and a control means for providing a control signal to the fuel supply means by utilizing the output of the first air/fuel ratio sensor as a feedback signal to correct any deviation of the air/fuel ratio indicated by the feedback signal from a predetermined air/fuel ratio. The first air/fuel ratio sensor is preferably of the concentration cell type having a layer of an oxygen ion conductive solid electrolyte and two electrode layers formed on the solid electrolyte layer. Preferably control system further comprises a power supply means for forcing a constant DC current of a predetermined intensity to flow through the solid electrolyte layer between the two electrode layers of the first sensor thereby selectively affording the first sensor with one of first type slope output characteristic, which means that the magnitude of the output of the sensor gradually varies as the air/fuel ratio of the air-fuel mixture varies but remains above the stoichiometric air/fuel ratio of the air/fuel mixture, and second type slope output characteristic which means that the magnitude of the output of the sensor gradually varies as the air/fuel ratio varies but remains below the stoichiometric ratio, and a second oxygen-sensitive air/fuel ratio sensor disposed in the exhaust passage so as to be located close to the first sensor. The second sensor preferably has a layer of an oxygen ion conductive solid electrolyte and two electrode layers formed on the solid electrolyte layer and exhibits an on-off type output characteristic which means that the magnitude of the output of the second sensor undergoes a sharp change between a maximally high level and a minimally low level when the air/fuel ratio of the air-fuel mixture changes across the stoichiometric ratio, and the aforementioned control means preferably includes a discriminating means for ascertaining the information given by the output of the first sensor with reference to the output of the second sensor.

A feedback control system according to the invention may be applied to an engine operated with either a lean mixture of a rich mixture, although this control system can be applied to an engine operated with a stoichiometric air-fuel mixture. The first air/fuel ratio sensor in this control system is preferably of the type illustrated in FIGS. 4 and 5. This control system includes the second oxygen-sensitive air-fuel ratio sensor, which preferably exhibits an output characteristic as represented by the curve of FIG. 2, for the purpose of ascertaining whether the output of the first sensor is truly attributed to its slope output characteristic. For example, when the first sensor is operated with the first type slope output characteristic as represented by curve A of FIG. 6 and provides an output voltage corresponding to $V_{01}$ in FIG. 6, it can be ascertained that the output voltage $V_{01}$ is produced at point P in the curve A by confirming that the output of the second sensor at the same moment is at the minimally low level. If the output of the second sensor is higher than the minimally low level, the output $V_{01}$ of the first sensor should be considered as to be produced at point Q in curve A.

Thus the present invention makes it possible to accomplish feedback control of the air-fuel mixing ratio of either a lean mixture of a rich mixture without the possibility of making an erroneous determination that, for example, an intended mixing ratio is realized despite the fact that a greatly deviated and nearly stoichiometric mixing ratio is created.

The second sensor in this system may preferably be either a conventional oxygen sensor as represented by the one shown in FIG. 1 or the advanced sensor as illustrated in FIGS. 4 and 5.

DESCRIPTION OF THE PREFERRED EMBODIMENTS

Figure 7:
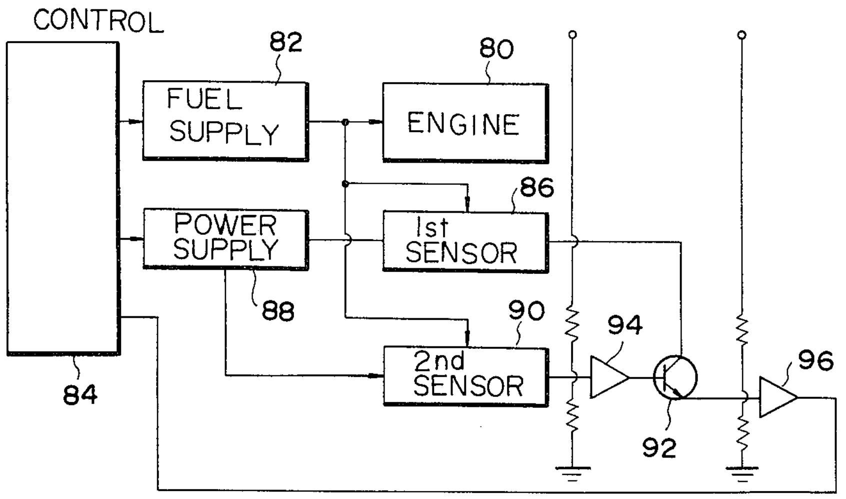
FIG. 7 is a block diagram of an air/fuel ratio control system according to the present invention.

FIG. 7 shows a feedback air/fuel ratio control system according to the invention which is applied to an internal combustion engine 80 operated with a rich mixture to maintain a predetermined air/fuel ratio, which is below the stoichiometric ratio and may be assumed to be 13.5 by way of example.

This control system includes a first oxygen-sensitive air/fuel ratio sensor 86, which is of the type represented by the element 50 in FIG. 4, and a second oxygen-sensitive air/fuel ratio sensor 90, both installed in the exhaust passage of the engine 80. Indicated at 84 is a control circuit which provides a control signal to an air-fuel proportioning means 82 comprising an actuator such as an electromagnetic valve to vary the rate of fuel feed either directly or by admission of a variable quantity of auxiliary air into fuel. A power supply circuit 88 supplies a constant DC current of an adequate intensity to the first sensor 86 so as to make this sensor 86 exhibit a slope output characteristic as represented by the curve B of FIG. 6. The second sensor 90 exhibits an on-off type output characteristic as represented by the curve of FIG. 2. When the second sensor 90 is of the type as shown in FIG. 5, the power supply circuit 88 supplies a constant DC current of a sufficiently high intensity to this sensor 90.

As a part of the control circuit 84, there is a discriminating circuit having a transistor 92 and amplifiers 94 and 96. The output of the first sensor 86 is supplied to the collector of the transistor 92 while the output of the second sensor 90 is applied to the base of the transistor 92 via the amplifier 94.

Assume that a desirably rich mixture is flowing in the induction passage so that the output voltage $V_{02}$ of the first sensor 86 is produced at point R in the curve B. Then the output of the second sensor 90 is at the maximally high level. Accordingly the base potential of the transistor 92 becomes high, and this transistor 92 is in the conducting state. Therefore, the output voltage $V_{02}$ of the first sensor 86 is transmitted to the main part of the control circuit 84, which will produce an appropriate control signal based on this voltage $V_{02}$. If a nearly stoichiometrical air-fuel mixture is supplied to the engine 80 so that the output voltage $V_{02}$ of the first sensor 86 is produced at point S in the curve B, the output of the second sensor 90 is below the maximally high level so that the transistor 92 is in the non-conducting state. As a consequence the output voltage $V_{02}$ of the first sensor 86 is not supplied to the main part of the control circuit 84. Then the control circuit 84 makes a determination that the actual air/fuel ratio is above the target value and continues to command the air-fuel proportioning means 82 to increase the rate of fuel feed, until the transistor 92 becomes conducting to resume transmission of the output of the first sensor 86 to the control circuit 84.

Figure 8:
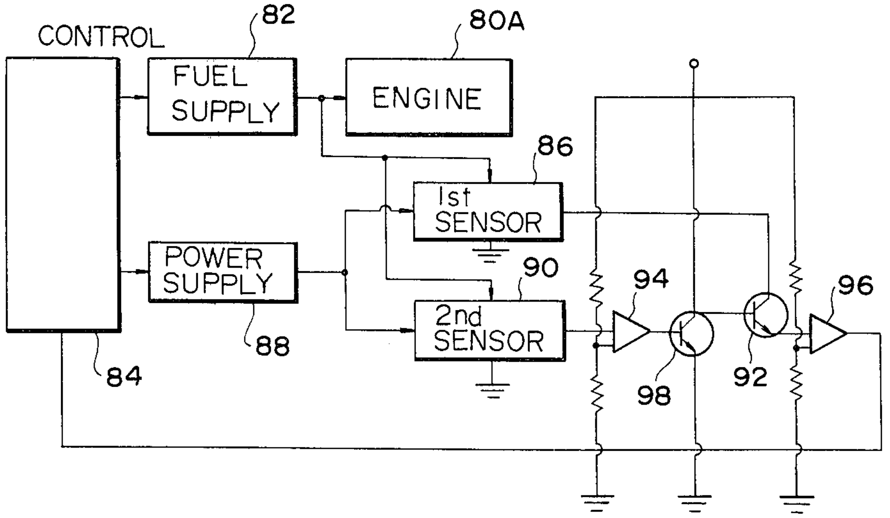
FIG. 8 is a block diagram showing a modification of the system of FIG. 7.

FIG. 8 shows the application of a similar feedback control system to an engine 80A operated with a lean mixture. In this system a discriminating circuit is constructed by adding a transistor 98 to the discriminating circuit of FIG. 7, and the output of the second sensor 90 is applied to the base of this transistor 98. The collector of the transistor 98 is connected to the base of the transistor 92 such that a source voltage is applied to the base of the transistor 92 when the transistor 98 is non-conducting.

Assume that a desirably lean mixture is flowing in the induction passage so that the output voltage $V_{01}$ of the first sensor 86 is produced at point P in curve A of FIG. 6. Then the output of the second sensor 90 is at the minimally low level, so that the transistor 98 is in the non-conducting state. Accordingly the source voltage is applied to the base of the transistor 92 to make it conducting. As a consequence the output voltage $V_{01}$ of the first sensor 86 is transmitted to the main part of the control circuit 84. When an approximately stoichiometrical air-fuel mixture is flowing in the induction passage so that the output voltage $V_{01}$ of the first sensor 86 is produced at point Q in curve A, the output of the second sensor 90 is above the minimally low level so that the transistor 98 becomes conducting. Then the transistor 92 becomes non-conducting and interrupts the transmission of the output voltage $V_{01}$ of the first sensor 86 to the main part of the control circuit 84.

The power supply circuit 88 may comprise a switch corresponding to the switch 74 in FIG. 5 for switchover of the direction of flow of the current in the first sensor 86. (The relationship between the direction of flow of the current and the output characteristic of the sensor 86 is as described hereinbefore with reference to FIGS. 4–6.) In such a case, the control circuit 84 is made to comprise both the discriminating circuit of FIG. 7 and that of FIG. 8.

The power supply circuit 88 and the control circuit 84 in FIGS. 7 and 8 are preferably constructed such that the intensity of the current supplied to the first sensor 86 is temporarily varied according to operating conditions of the engine. When, for example, the engine is operated under an accelerating condition or full-throttle condition and requires the feed of a considerably rich mixture (e.g. mixture having an air/fuel ratio of about 13.5), it is suitable to augment the current intensity to about 10 $\mu$A thereby to raise the output level of the first sensor 86. When the engine requires a slightly rich mixture (e.g. mixture having an air/fuel ratio of about 14.5), a suitable current intensity will be about 5 $\mu$A.

Figure 9:
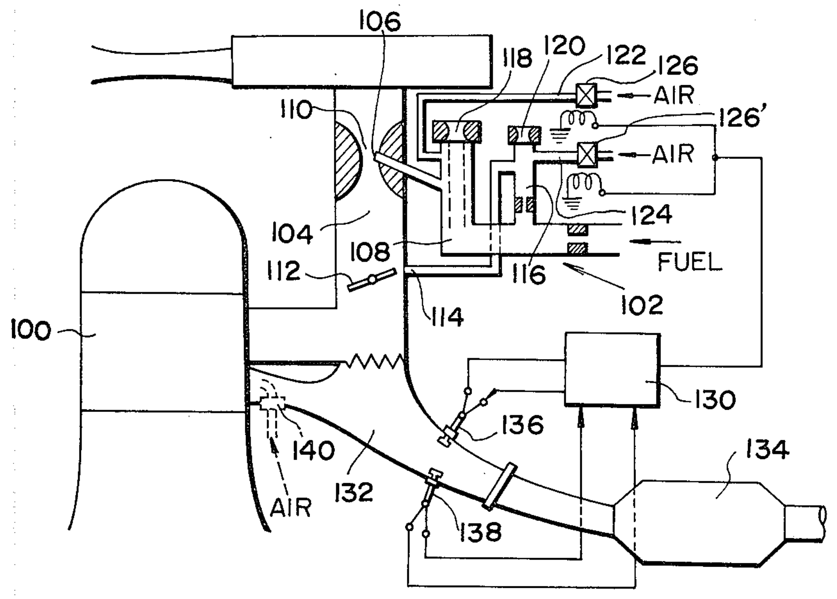
FIG. 9 is a schematic and sectional illustration of intake and exhaust systems of a gasoline engine provided with an air/fuel ratio control system embodying the present invention.

FIG. 9 shows the application of the present invention to an automotive gasoline engine 100 provided with a carburetor 102. A main fuel nozzle 106 at the terminal of a main fuel passage 108 in the carburetor 102 opens into an induction passage 104 at a venturi section 110 upstream of a throttle valve 112, and a slow-port 114 at the terminal of a slow-speed fuel passage 116 opens into the induction passage 104 at a section near the throttle valve 112. The main fuel passage 108 is provided with a main air bleed 118 in the usual manner, and the slow-speed fuel passage 116 is also provided with a main air bleed 120. In addition, an auxiliary air bleed 122 is provided for the main fuel passage 108 and similarly an auxiliary air bleed 124 for the slow-speed fuel passage 116. Electromagnetic flow control valves 126 and 126' of the on-off functioning type are respectively associated with the two auxiliary air bleeds 122 and 124 so as to simultaneously control the admission of air through these auxiliary air bleeds 122, 124 in response to a control signal supplied from a control unit 130.

A catalytic converter 134 containing an oxidation catalyst occupies a section of an exhaust passage 132 for this engine 100. Upstream of the catalytic converter 134, a first oxygen-sensitive air/fuel ratio sensor 136 and a second oxygen-sensitive air/fuel ratio sensor 138 are installed in the exhaust passage 132 so as to be located close to each other. The first sensor 136 is of the type as illustrated in FIGS. 4 and 5, and the control unit 130 supplies a constant DC current of an adequate intensity to this sensor 136 to flow in such a direction that the sensor 136 exhibits a slope output characteristic as represented by curve A of FIG. 6. The second sensor 138 is one that exhibits an on-off type output characteristic as represented by the curve of FIG. 2. When the second sensor 138 is similar in construction to the first sensor 136, the control unit 130 supplies a constant DC current, which is higher in intensity than the current supplied to the first sensor 136, to the second sensor 138 thereby to afford this sensor 138 with the on-off output characteristic.

The control unit 130 receives both the output of the first sensor 136 and the output of the second sensor 138 and, based fundamentally on the output of the first sensor 136, produces a control signal for the control of the proportion of the on-period to off-period of the electromagnetic valves 126, 126' so as to realize a predetermined air-fuel mixing ratio. In this case, the target value of the air/fuel ratio is made to be about 16.5 primarily with consideration of the efficiency of the oxidation catalyst in the converter 134. The control unit 130 commands the electromagnetic valves 126, 126' to admit an increased quantity of air while the output voltage of the first sensor 136 is above a reference voltage, in this case about 0.55 V corresponding to the voltage $V_{01}$ in FIG. 6, but a decreased quantity of air when the output of the first sensor 136 is below this reference voltage. The control circuit 130 includes a discriminating circuit as shown in FIG. 8 and always ascertains the meaning of the output of the first sensor 136 by utilizing the output of the second sensor 138.

Since there exists a considerably long gas passage between the carburetor 102 and the air/fuel ratio sensor 136 with the interposition of the combustion chambers of the engine 100 and since the sensor 136 itself consumes a certain amount of response time, it is inevitable that a correction of the air/fuel ratio is achieved with some time lag behind the generation of a corrective control signal by the control unit 130. The amount of this time lag does not significantly differ whether the sensor 136 is of the slope output characteristic type or of the conventional on-off output characteristic type and is usually as small as 200–300 ms and about 900 ms at the maximum. Because of the existence of such time lag in the response of the control system, the air/fuel ratio under the feedback control according to the invention cannot be maintained exactly at the target value, 16.5: the air/fuel ratio continues to fluctuate about the target value alternately upward and downward, and the maximum width of fluctuations is about ±0.25. In automobiles equipped with a catalytic converter containing an oxidation catalyst, a satisfactory level of exhaust-purifying efficiency can be maintained insofar as errors in controlling the air/fuel ratio to 16.5 are within ±0.5. Therefore, the accuracy of the air/fuel ratio control by the present invention can be rated exceedingly high.

In current automobiles it is popular to reduce the emission of NOx by recirculation of a portion of the exhaust gas while the emission of CO and HC is reduced by means of an oxidation catalyst or a thermal reactor. To accomplish a relatively high rate of exhaust gas recirculation with the maintenance of stable operation of the engine, it becomes necessary to supply a rich mixture to the engine. Then, to maintain a high efficiency of the catalyst or the reactor there arises the need of introducing air into the exhaust gas by means of a secondary air supply device (in FIG. 9 indicated at 140) such that an overall air/fuel ratio, i.e. weight ratio of the sum of the air contained in the rich mixture and the secondary air to the fuel contained in the rich mixture, becomes about 16.5. When a high rate of exhaust gas recirculation is effected and secondary air is supplied to the exhaust gas, a suitable value of the air/fuel ratio of a rich mixture to be supplied to the engine is about 13.5 in the case of using an oxidation catalyst and about 12.5 in the case of a thermal reactor. Even though the carburetor 102 is preset so as to make the air/fuel ratio 13.5 or 12.5, the air/fuel ratio control system of FIG. 9 is made to perform the above described control process by keeping 16.5 as the target value (on the premise that secondary air is supplied) and utilizing the slope output characteristic of the first sensor 136 as represented by curve A of FIG. 6. In this case the air/fuel ratio of the mixture supplied to the engine is not always controlled precisely to 13.5 or 12.5, but, nevertheless, the composition of the exhaust gas entering the catalytic converter 134 (or an alternative thermal reactor) can be controlled as required.

Figure 10:
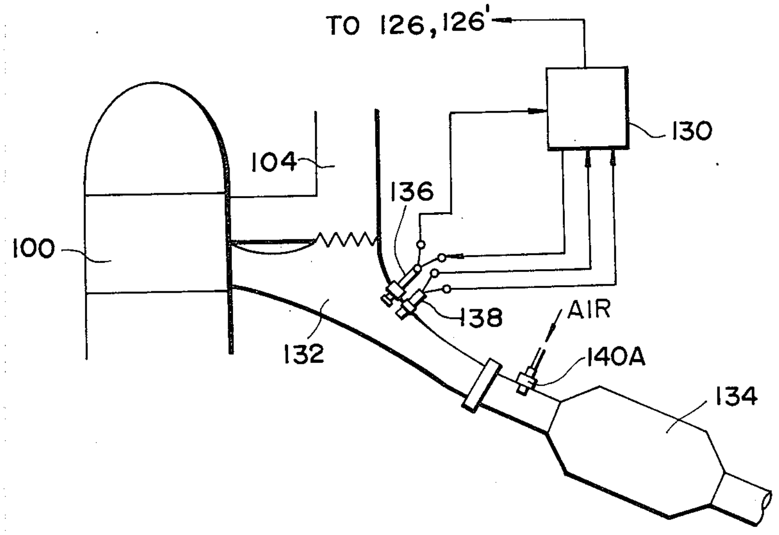
FIG. 10 shows a minor modification of the engine system of FIG. 9.

FIG. 10 shows a modification of the engine system of FIG. 9 with respect to the supply of secondary air to the exhaust gas. In this case, a secondary air supply device 140A is so arranged as to introduce air into the exhaust passage 132 at a section downstream from the sensors 136 and 138 but upstream of the catalytic converter 134. The engine 100 is fed with a rich mixture whose air/fuel ratio is intended to be 13.5 and operated with recirculation of exhaust gas, and the air/fuel control system is made to aim at realization of the intended air/fuel ratio of 13.5. Accordingly, the first sensor 136 is made to exhibit the slope output characteristic as represented by curve B of FIG. 6. The secondary air supply device 140A is adjusted such that the aforementioned overall air/fuel ratio becomes about 16.5. Therefore, the effect of the air/fuel ratio control system in FIG. 10 on the catalytic converter 134 is similar to that in the case of FIG. 9, but it becomes possible to accurately detect air/fuel ratio values of a rich mixture supplied to the engine.

Thus, the present invention makes it possible to perform accurate feedback control of air/fuel ratio even when either a lean mixture or a rich mixture is employed and, therefore, makes a great contribution to the enhancement of the exhaust-purifying efficiencies of oxidation catalysts and thermal reactors. Besides, the present invention is effective for improving the thermal efficiency and mechanical efficiency of the engines since, as is known, so-called lean-burn engines are generally high in thermal efficiency and so-called rich-burn engines are generally high in mechanical efficiency.

The present invention is applicable to both gasoline engines and Diesel engines. Furthermore, the invention can be applied to advanced types of internal combustion engines such as lean-burn engines the combustion chambers of which are each formed with an antechamber for ignition, quick-burn engines, the combustion chambers of which are each equipped with two spark plugs thereby performing a very high rate of exhaust gas recirculation by using a slightly rich mixture to maintain good driveability, engines provided with a catalytic converter containing a three-way catalyst and an altitute compensation system, and electronically controlled engines utilizing a microcomputer to widely variably control the air/fuel ratio according to engine operating conditions, and in every case the control of air/fuel ratio can be accomplished with improved precision.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A control system for feedback control of the air/fuel ratio of an air-fuel mixture supplied to an internal combustion engine, the system comprising:

an electrically controllable fuel supply means for supplying fuel to the engine;

a first oxygen-sensitive air/fuel ratio sensor having an oxygen ion conductive solid electrolyte layer and two electrode layers formed on the solid electrolyte layer and disposed in an exhaust passage of the engine;

a power supply means for supplying a DC current to said solid electrolyte layer of said first sensor whereby said first sensor produces an output having one of (a) first type slope output characteristic wherein the magnitude of the output of said first sensor varies generally proportionally as the air-fuel ratio of said air-fuel mixture varies but remains above the stoichiometric air/fuel ratio of said air-fuel mixture and (b) second type output characteristic wherein the magnitude of said first sensor varies generally proportionally as the air/fuel ratio varies but remains below said stoichiometric ratio;

a second oxygen-sensitive air/fuel ratio sensor disposed in said exhaust passage and positioned proximate to said first sensor, said second sensor having an off-type output characteristic wherein the output characteristic of said second sensor varies between a generally constant maximally high level and a generally constant maximally low level when the air/fuel ratio of said air-fuel mixture changes across said stoichiometric ratio; and a control means for providing a control signal to said fuel supply means by utilizing the output of said first sensor as a feedback signal, said control means further including a discriminating means responsive to the output of said second sensor for selectively blocking the output of said first sensor means from said control means according to the output of said second sensor.

2. A control system according to claim 1, wherein said solid electrolyte layer of said first sensor is a microscopically porous layer formed on a substantially flat substrate, a first one of said two electrode layers of said first sensor being a microscopically porous thin layer formed on the outer side of the solid electrolyte layer, a second one of said two electrode layers of said first sensor being a thin layer formed on the inner side of the solid electrolyte layer and, macroscopically, entirely shielded from an environmental atmosphere by said substrate and the solid electrolyte layer.

3. A control system according to claim 2, wherein said predetermined air/fuel ratio is higher than said stoichiometric ratio, and said DC current is forced to flow through the solid electrolyte layer of said first sensor from said first one of the two electrode layers towards said second one of the two electrode layers, whereby said first sensor exhibits said first type slope output characteristic.

4. A control system according to claim 2, wherein said predetermined air/fuel ratio is lower than said stoichiometric ratio, and said DC current is forced to flow through the solid electrolyte layer of said first sensor from said second one of the two electrode layers towards said first one of the two electrode layers, whereby said first sensor exhibits said second type slope output characteristic.

5. A control system according to claims 3 or 4, wherein the two electrode layers of said second sensor are microscopically porous layers respectively formed on two opposite sides of the solid electrolyte layer which is formed such that one of the two electrode layers is isolated from an exhaust gas flowing in said exhaust passage and exposed to the atmosphere.

6. A control system according to claims 3 or 4, wherein said second sensor is generally similar in construction to said first sensor and connected to said power supply means such that another DC current is forced to flow through the solid electrolyte layer between the two electrode layers of said second sensor, the intensity of said another DC current being higher than the intensity of said DC current supplied to said first sensor.

7. A control system according to claims 3 or 4, wherein said discriminating means comprises a voltage-responsive switching means for interrupting the transmission of the output of said first sensor when the output of said second sensor deviates from predetermined one of said maximally high level and said minimally low level.

8. A control system according to claim 7, wherein said switching means comprises a transistor, the output of said second sensor being applied to the base of said transistor.

9. The control system of claim 3 or 4, wherein said power supply means further comprises a switch for reversing the direction of current flow in said first sensor and means for varying the intensity of said DC current.

10. The control system of claim 1, wherein said electrically controlled fuel supply means further comprises a carburetor having electromagnetic valve means for controlling the air/fuel ratio in response to said control means.

11. The control system of claim 1, wherein said electrically controlled fuel supply means further comprises an electrically actuated fuel valve for controlling the air/fuel ratio in response to said control means.

* * * * *